March 6, 1951  P. M. ERLANDSON  2,543,769
DIRECTIONAL INDICATOR
Filed Dec. 30, 1944  3 Sheets-Sheet 1
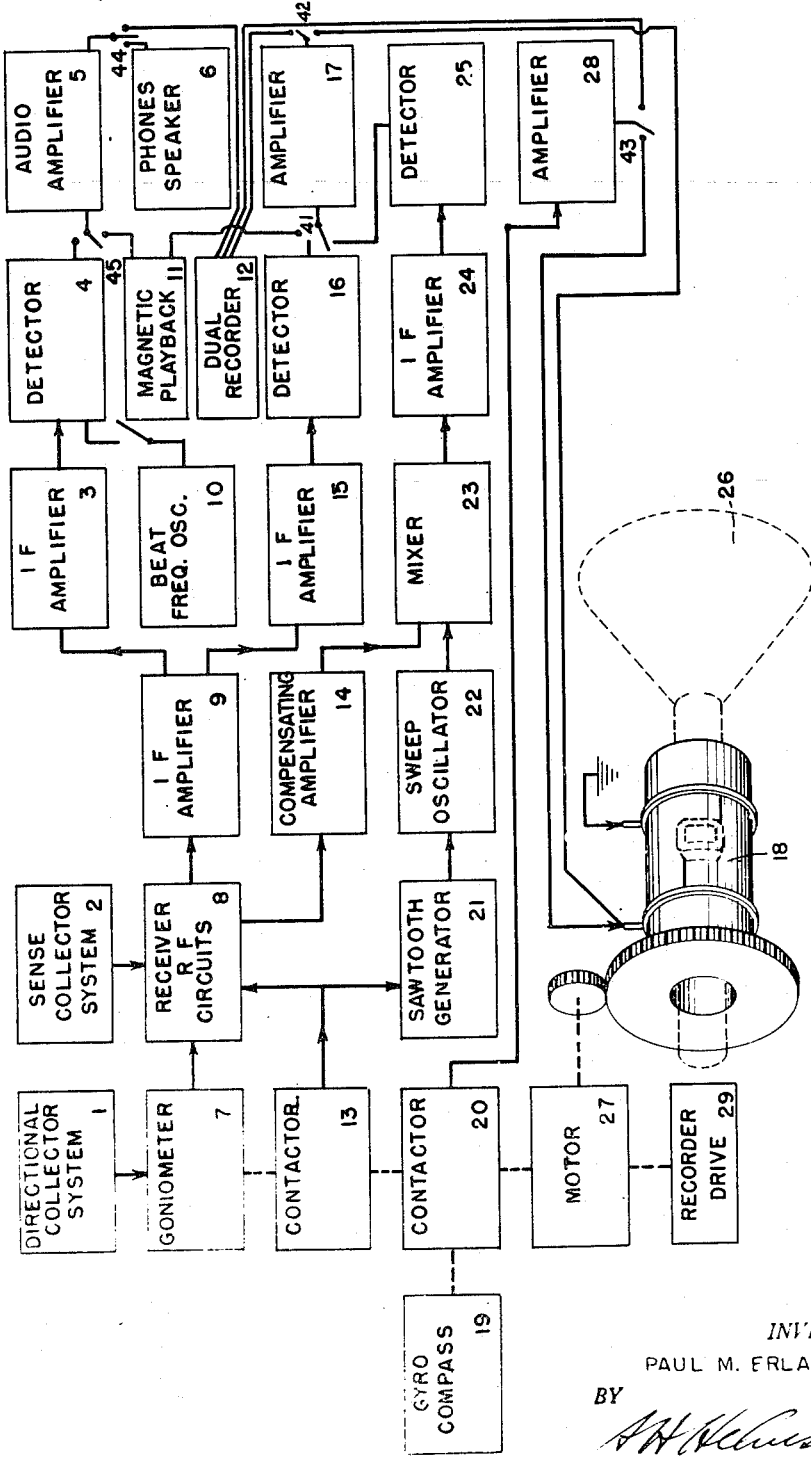
FIG. I
INVENTOR.
PAUL M. ERLANDSON
BY
ATTORNEY March 6, 1951
P. M. ERLANDSON
2,543,769
DIRECTIONAL INDICATOR
Filed Dec. 30, 1944
3 Sheets-Sheet 2
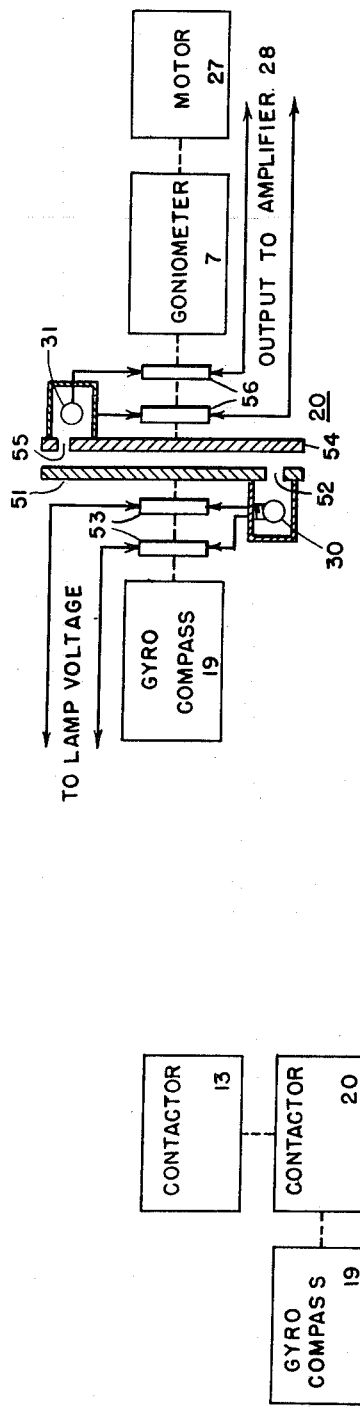
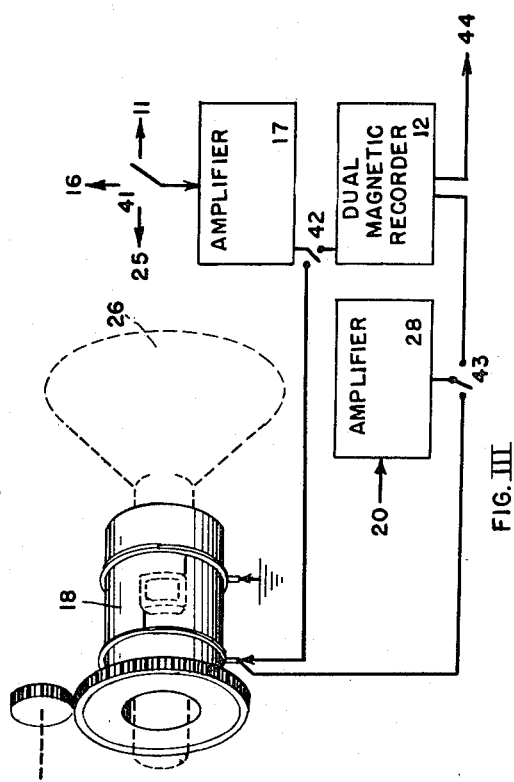
INVENTOR.
PAUL M. ERLANDSON
BY
ATTORNEY March 6, 1951　　　P. M. ERLANDSON　　　2,543,769
DIRECTIONAL INDICATOR
Filed Dec. 30, 1944　　　　　　　　　　　　3 Sheets—Sheet 3
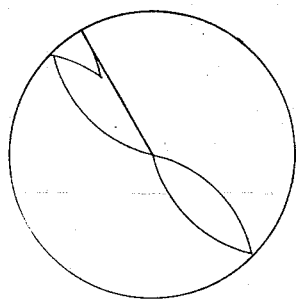
FIG. VIII
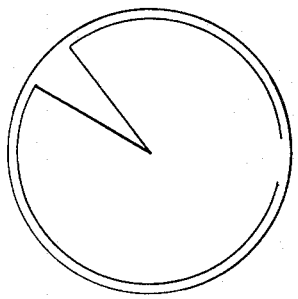
FIG. VII
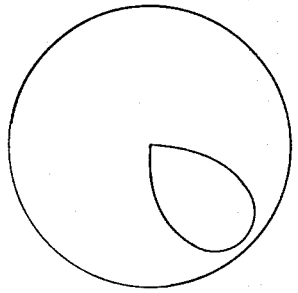
FIG. VI
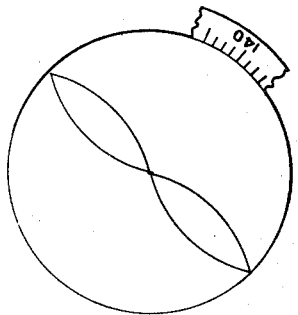
FIG. V
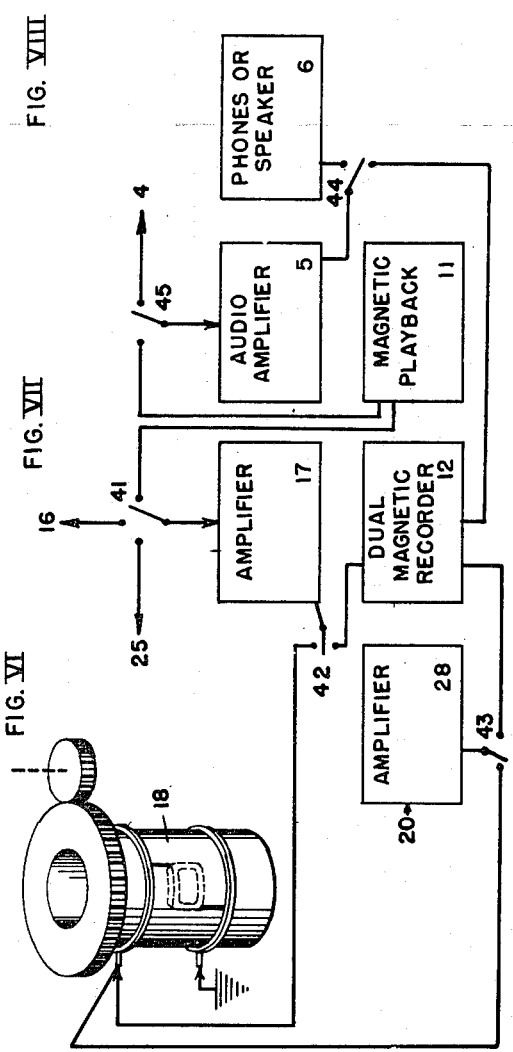
FIG. IV
INVENTOR.
PAUL M. ERLANDSON
BY
ATTORNEY Patented Mar. 6, 1951

2,543,769

UNITED STATES PATENT OFFICE 2,543,769

DIRECTIONAL INDICATOR

Paul M. Erlandson, United States Navy

Application December 30, 1944, Serial No. 570,721

8 Claims. (Cl. 343—118)

(Granted under the act of March 3, 1883, as amended April 30, 1928; 370 O. G. 757)

This invention relates to direction finding systems; and particularly to such systems in which the bearing may be directly indicated on the screen of a cathode ray tube.

One object is to produce a visual indication of a bearing together with an indication of the heading of the ship, aircraft, or vehicle in which the equipment is installed.

Another object is to make records of bearings obtained, and provide for subsequent reproduction.

Other objects will become evident from a study of the following specification and claims.

The invention is illustrated in the accompanying drawings in which:

Fig. I is a block diagram of the system as a whole with a portion illustrated schematically.

Fig. II illustrates in detail a portion of Fig. I.

Figure III shows a portion of a further embodiment of the system.

Figure IV shows a portion of another embodiment of the system.

Fig. V is the directional pattern obtained on the cathode ray tube.

Fig. VI is the sense pattern obtained.

Fig. VII is the scanning pattern obtained.

Fig. VIII is the directional pattern combined with the trace showing absolute direction.

In connection with operation of ships and aircraft in isolated areas, it is foreseen that numerous occasions will arise when radio distress signals will be transmitted, in most cases on specially assigned frequencies, which will be guarded by other vessels, aircraft, and shore stations.

In other cases, vessels, aircraft, and shore stations may be required to guard frequencies on which it is suspected that illegal or enemy signals may occur.

In these and other situations, it will be of definite advantage if vessels, aircraft, and shore stations are equipped with radio direction finders, and are able to obtain automatically records of signals and the associated true azimuthal and/or vertical bearings, with simultaneous knowledge of the times and frequencies at which such signals were received.

In still other cases, during operation of radar or similar equipments, it will also be of advantage to obtain, automatically, records of the bearings and ranges of various objects which may be detected, with simultaneous knowledge of the times at which such detections occurred.

It is also desirable to have means available to play back or reproduce such records in such a manner that the desired information can be quickly and easily interpreted by operators.

It is apparent that many of the direction finder and radar instruments in future use will be of the automatic or instantaneous indicating types wherein the intelligence is indicated by means of a trace on a cathode ray tube, or by means of a mechanically actuated rotatable azimuth scale, or by other similar means.

In some of such devices installed in vehicles, ships, or aircraft, true bearings are indicated; however, in others only relative bearings are indicated, and reference to a gyro-compass repeater or similar device by an operator is necessary to determine the actual true bearings. It will be of advantage to eliminate the necessity of reference to such separate devices.

Systems which will provide the above advantages are described herein. In one type of direction finder equipment described, the systems proposed could be applied as shown in Fig. I. In that figure, 1 is a directional antenna or collector system, such as fixed crossed loops or Adcock monopoles, connected to a goniometer 7 by transmission lines. 2 is a vertical monopole or other omnidirectional sense collector system. The radio frequency output voltages from 7 and 2 are fed into the receiver by suitable transmission lines, and are properly phased, combined, and amplified by the radio frequency circuits of the receiver 8. In circuits of 8, the radio frequency voltages are then converted to a suitable intermediate frequency, and fed to the amplifier 9.

On passing through 9, one portion of the intermediate frequency voltage is passed through a narrow band amplifier 3, a detector 4, and an audio amplifier 5, which delivers audio frequency voltages to headphones or a loudspeaker 6. Audio amplifier 5 has connected to its input a two position switch 45 whereby input to the amplifier may be had from either the detector 4 or magnetic playback 11. Amplifier 5 also has in its output a two position switch 44 whereby the output may be fed to either the phones 6 or the dual magnetic recorder 12. By means of a local beat frequency oscillator 10, the output of which is injected into the intermediate frequency channel as shown, audible reception of keyed Continuous Wave signals is possible.

The second portion of the intermediate frequency voltage from 9 is passed through an amplifier 15, a detector 16, and an amplifier 17, from where it is fed into the deflection coils 18, of the indicator by a suitable slip ring arrangement.

As can be clearly seen from Fig. I, the input to amplifier 17 is connected to a three position switch 41 so that a signal may be put into amplifier 17 from detector 16, detector 25, or magnetic playback 11. The output of amplifier 17 has a two position switch 42 to feed the output to either deflection coils 18 or magnetic recorder 12. Since the magnetic deflection coils 18 are rotated as illustrated in Figure II on a common shaft with the goniometer 7 by the motor 27, when the various control are properly adjusted a propeller-shaped trace such as shown in Fig. V appears on the screen of the cathode ray tube 26.

In an improvement on this particular type of direction finder, whereby it is possible to guard a wide band of frequencies, a contactor 13 actuated by the rotation of the motor 27 actuates a sawtooth generator 21, which in turn, actuates an oscillator 22 which is swept over a specified frequency band at a rate synchronous with the frequency of rotation of the deflection coils 18. The contactor 13 is any mechanical contactor, such as a can or the like, with the necessary linkages to the receiver 8 and sawtooth generator 21, so that the tuning elements of the receiver and generator are swung through a specified band of frequencies as the motor 27 rotates. The output of the receiver radio frequency circuits is also fed into a compensating amplifier 14 which tends to compensate for the selectivity of the receiver radio frequency circuits 8. Amplifier 14 is of the type having the familiar double hump characteristic to pass a wide band of frequencies. In one form of the invention this pass band has been made 150 kilocycles, although either a wider or narrower band may be used. Sweep oscillator 22 beats with each portion of the signal output of 14 in mixer 23 in turn generating intermediate frequency components which are detected and applied to the indicator deflecting coils 18. Through this action a pattern such as shown in Fig. VII is produced when a signal field at a frequency of about 30 kilocycles above that to which the receiver is tuned appears at the collector system 1 and the sense antenna 2.

The signals are also applied to the deflection coils 18 through the channel 8, 9, 15, 16 and 17, to produce a pattern such as shown in Fig. V. This indicates the relative direction of the received signals with respect to a particular orientation of the collector, or in other words the relative bearing of the signal with respect to the heading of the ship on which the device is located.

The above circuits are known in the art, and my invention relates to improvements thereon.

In one embodiment of my invention, as shown in Fig. I, an additional contactor 20 is actuated by the motor 27 and the gyro-compass system 19 in such a manner as to give an indication of the true bearing of the ship's head. The contactor 20, which is shown in detail in Fig. II, consists of a disk 51 which revolves with the shaft of gyrocompass 19, there being a slit 52 in the disk 51 through which shines a light beam from a source of light 30 which is energized from some source of voltage by means of slip-rings 53. In close proximity to disk 51 is another disk 54 which is rotated by the motor 27 in synchronism with the goniometer 7, the disk 54 also having in it a slit 55 behind which is located a phototube 31, the phototube in turn being connected to amplifier 28 by means of the slip rings 56. In operation the disk 51 and lamp 30 move slowly and intermittently as the gyrocompass maintains a bearing on true north, while at the same time disk 54 and phototube 31 are turning with the goniometer. Whenever slits 52 and 55 line up, a signal is generated by the phototube 31 as an indication of where, in its cycle of rotation, the goniometer passes through true north.

The voltage derived from phototube 31 in the contactor 20 is amplified through an amplifier 28 if necessary, and fed to the indicator deflection coils 18 by means of two position switch 43 in such a manner as to produce a sharp outward peaked trace on the cathode ray tube screen as shown in Fig. VIII, superimposed on the directional pattern trace. Thus the trace illustrated in Fig. VIII shows the bearing of a received signal relative to the ship's head by means of the position of the propeller shaped trace, and an indication of true north by means of the peaked trace. It should be realized that many additional methods exist of displaying the indication of ship or aircraft heading, such as momentarily blanking the tube by applying a voltage pulse to a control electrode, etc.

Alternatively, as shown in the embodiment illustrated in Figure III, the voltage derived through the contactor 20 is amplified by the amplifier 28, and such amplified output is then fed through switch 43, together with the output of the amplifier 17, into one tape of a magnetic wire recorder, or other suitable recording device. Simultaneously, the output of the amplifier 5 is fed into another tape of the recorder, operating synchronously with the first tape.

Suitably convenient switching and gain control devices are used to fully accomplish the purpose of the above devices, which is to visually indicate and/or record the intelligence derived from the audio and indicator channels of the direction finder.

In a further embodiment of my invention, as shown in Fig. IV, the magnetic tapes or other recording media are passed through a reproducing device 11 in such a manner that the original recorded voltages are reproduced, properly amplified, and fed to the phones or loud-speaker 6 and the deflection coils 18 in such a manner that the uncorrected true bearing of the original signal, and its corresponding audio signals would be available to an operator. Since a trace on the cathode-ray tube corresponding to the heading of the vehicle, aircraft, or vessel in which the equipment was installed appears in addition to the propeller-shaped pattern indicating the uncorrected relative bearing of the signal, the true bearing of the source of the received signal can be readily determined, after correction of the bearing for errors commonly encountered in typical direction finders, and correctably by well-known calibration procedures.

Since it is advisable to provide automatic indication of the sense of the desired bearing, it is possible to provide automatic injection of the voltages derived from the sense antenna 2 into the receiver radio frequency circuits 8 by a suitable contactor actuated by the motor, such as 13, and a relay (not illustrated) actuated by the contactor, or by other suitable means. The relative amplitude of sense and directional voltages is maintained at a proper value by means of a suitable gain control, manual or automatic.

Although it is not absolutely necessary if correction for deviation errors is not desirable, it is possible to reproduce the bearing and sense patterns in their correct relationship to the azimuth scale by using the motor 27 to drive the recording mechanism, and the reproducing mechanism.

It is obvious that the above idea can be applied to different types of direction finders, such as twin-channel (dual receiver) types, with cathode-ray indication, and to various types of radar equipments. If necessary, a number of separate recorders may be used for the latter purpose, provided they are synchronized.

While I have described specific embodiments of my invention, it should be expressly understood that various modifications thereof may be made without departing from the spirit of the appended claims.

The invention described herein may be manufactured and used by or for the Government of the United States of America for governmental purposes without the payment of any royalties thereon or therefor.

What is claimed is:

1. In a direction finder system, means for receiving signals, means for producing a first set of impulses from the received signals within the audio range, means for producing a second set of impulses indicative of the received signals, means for producing a third set of impulses indicative of absolute bearing, and means for simultaneously recording the combination of the first and second sets of impulses as well as the third set of impulses.

2. The combination of the direction finder system of claim 1 including a cathode ray tube indicator, means for reproducing the previously recorded sets of impulses, and means for applying to the indicator either currently received or previously recorded sets of impulses.

3. In a direction finder system; a collector system connected to a goniometer; receiver circuits for rendering signals from said collector intelligible; a cathode ray tube including deflection coils; means for recording said signals; a motor for simultaneously rotating said goniometer; deflection coils, and recording means; and means whereby visible traces will be caused to appear on said cathode ray tube to indicate all the elements of intelligence previously received and rendered by the system.

4. In a direction finder system, means for receiving signals, an electronic indicator, means for producing impulses representative of said received signals, means for applying said impulses to the indicator to show relative bearing, a gyroscopic device for determining true bearing, a first disk and light means integral therewith moving in response to said gyroscopic device, a second disk and phototube integral therewith synchronously rotating with said receiving means, slots in said first and second disks positioned for alignment, said alignment producing other impulses indicative of the true bearing, and means for applying said other impulses to the indicator, whereby both relative and true bearings are shown simultaneously.

5. In a direction finder system, a collector, an electronic indicator, receiver means associated with said collector for producing impulses representative of received signals, means for connecting said impulses to the indicator for showing relative bearing, motor actuated means for causing the receiver means to sweep over a predetermined band of frequencies, means for producing other impulses representative of signals received in said predetermined band, said aforementioned connecting means serving to connect either of the produced impulses to the indicator, a device for producing indications of true bearing, and means for coupling said true bearing to the indicator whereby both relative and true bearings are shown simultaneously.

6. In a direction finder system, a collector, means for rendering impulses from said collector intelligible, an electronic indicator, means for applying said impulses to said indicator to show relative bearing, a device for showing absolute direction, said device consisting of a disk rotatable by a gyrocompass the disk having a slit therein behind which is mounted a source of light and another disk in close proximity to the first and rotatable with the above mentioned collector, the second disk having a slit therein behind which is mounted a phototube, the phototube producing impulses indicative of true bearing when the two disks are in alignment, and means for feeding the last mentioned impulses to said electronic indicator whereby relative and true bearings are shown simultaneously.

7. In a direction finder system; a collector for receiving signals; a goniometer connected to said collector; receiver circuits connected to said goniometer for rendering the signals from the collector intelligible; a cathode ray tube having deflection coils mechanically rotatable about its shank; a gyrocompass; impulse producing means controlled by said gyrocompass; recording means; motor means for rotating the goniometer, deflection coils, impulse producing means and recorder drive; means for applying the said signals and impulses to said recorder; a playback system; and means for playing back the previously recorded signals and impulses and applying them to the aforementioned cathode ray tube whereby indications of both true and relative bearings are shown.

8. In a direction finder system, a collector system, an electronic indicator, means for applying signals from said collector system to said indicator to show relative direction, said means adapted to apply said signals to said indicator in response to frequencies within a determined band, a device for indicating absolute direction, means for connecting said device to said indicator to show absolute direction, means for recording any of said signals applied to said indicator, and means for reproducing said recorded signals on said indicator at a subsequent time.

PAUL M. ERLANDSON.

REFERENCES CITED

The following references are of record in the file of this patent:

UNITED STATES PATENTS

| Number | Name | Date |
| --- | --- | --- |
| 1,525,177 | Goldschmidt | Feb. 3, 1925 |
| 1,996,869 | Hyland et al. | Apr. 9, 1935 |
| 2,027,529 | Hammond, Jr. | Jan. 14, 1936 |
| 2,122,091 | Davies | June 28, 1938 |
| 2,183,634 | Zworykin | Dec. 19, 1939 |
| 2,214,342 | Neufeld | Sept. 10, 1940 |
| 2,262,033 | Moseley | Nov. 11, 1941 |
| 2,279,246 | Podliasky et al. | Apr. 7, 1942 |
| 2,296,041 | Luck | Sept. 15, 1942 |
| 2,308,936 | Schuchardt et al. | Jan. 19, 1943 |
| 2,323,534 | Goddard | July 6, 1943 |
| 2,361,956 | Moseley | Nov. 7, 1944 |
| 2,400,232 | Hall | May 14, 1946 |
| 2,406,406 | Sandretto et al. | Aug. 27, 1946 |
| 2,410,424 | Brown | Nov. 5, 1946 |
| 2,463,529 | Ferrill | Mar. 8, 1949 |

FOREIGN PATENTS

| Number | Country | Date |
| --- | --- | --- |
| 375,372 | Great Britain | June 27, 1932 |